(12) United States Patent
Jeddeloh et al.

(10) Patent No.: US 7,908,452 B2
(45) Date of Patent: *Mar. 15, 2011

(54) METHOD AND SYSTEM FOR CONTROLLING MEMORY ACCESSES TO MEMORY MODULES HAVING A MEMORY HUB ARCHITECTURE

(75) Inventors: Joseph M. Jeddeloh, Shoreview, MN (US); Terry R. Lee, Boise, ID (US)

(73) Assignee: Round Rock Research, LLC, Mt. Kisco, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/754,011

(22) Filed: Apr. 5, 2010

(65) Prior Publication Data

US 2010/0191924 A1 Jul. 29, 2010

Related U.S. Application Data

(63) Continuation of application No. 11/881,010, filed on Jul. 24, 2007, now Pat. No. 7,716,444, which is a continuation of application No. 10/963,824, filed on Oct. 12, 2004, now Pat. No. 7,249,236, which is a continuation of application No. 10/232,473, filed on Aug. 29, 2002, now Pat. No. 6,820,181.

(51) Int. Cl.
G06F 12/00 (2006.01)
(52) U.S. Cl. ........................................ 711/169
(58) Field of Classification Search ............... None
See application file for complete search history.

(56) References Cited

U.S. PATENT DOCUMENTS

| 4,045,781 | A | 8/1977 | Levy et al. |
| 4,240,143 | A | 12/1980 | Besemer et al. |
| 4,245,306 | A | 1/1981 | Besemer et al. |
| 4,253,144 | A | 2/1981 | Bellamy et al. |
| 4,253,146 | A | 2/1981 | Bellamy et al. |
| 4,707,823 | A | 11/1987 | Holdren et al. |
| 4,724,520 | A | 2/1988 | Athanas et al. |
| 4,930,128 | A | 5/1990 | Suzuki et al. |

(Continued)

FOREIGN PATENT DOCUMENTS

EP 0395559 A2 10/1990

(Continued)

OTHER PUBLICATIONS

Intel, "Intel 840 Chipset: 82840 Memory Controller Hub (MCH)", Datasheet, Oct. 1999, pp. 1-178.

(Continued)

*Primary Examiner* — Brian R Peugh
(74) *Attorney, Agent, or Firm* — Lerner, David, Littenberg, Krumholz & Mentlik, LLP

(57) ABSTRACT

A computer system includes a memory hub controller coupled to a plurality of memory modules. The memory hub controller includes a memory request queue that couples memory requests and corresponding request identifier to the memory modules. Each of the memory modules accesses memory devices based on the memory requests and generates response status signals from the request identifier when the corresponding memory request is serviced. These response status signals are coupled from the memory modules to the memory hub controller along with or separate from any read data. The memory hub controller uses the response status signal to control the coupling of memory requests to the memory modules and thereby control the number of outstanding memory requests in each of the memory modules.

3 Claims, 4 Drawing Sheets

U.S. PATENT DOCUMENTS

| | | | |
|---|---|---|---|
| 5,133,059 A | 7/1992 | Ziegler et al. |
| 5,241,506 A | 8/1993 | Motegi et al. |
| 5,243,703 A | 9/1993 | Farmwald et al. |
| 5,251,303 A | 10/1993 | Fogg, Jr. et al. |
| 5,269,022 A | 12/1993 | Shinjo et al. |
| 5,317,752 A | 5/1994 | Jewett et al. |
| 5,319,755 A | 6/1994 | Farmwald et al. |
| 5,355,391 A | 10/1994 | Horowitz et al. |
| 5,432,823 A | 7/1995 | Gasbarro et al. |
| 5,432,907 A | 7/1995 | Picazo, Jr. et al. |
| 5,442,770 A | 8/1995 | Barratt |
| 5,461,627 A | 10/1995 | Rypinski |
| 5,465,229 A | 11/1995 | Bechtolsheim et al. |
| 5,465,343 A | 11/1995 | Henson et al. |
| 5,479,370 A | 12/1995 | Furuyama et al. |
| 5,497,476 A | 3/1996 | Oldfield et al. |
| 5,502,621 A | 3/1996 | Schumacher et al. |
| 5,544,319 A | 8/1996 | Acton et al. |
| 5,566,325 A | 10/1996 | Bruce, II et al. |
| 5,577,220 A | 11/1996 | Combs et al. |
| 5,581,767 A | 12/1996 | Katsuki et al. |
| 5,606,717 A | 2/1997 | Farmwald et al. |
| 5,619,670 A | 4/1997 | Shindo |
| 5,638,334 A | 6/1997 | Farmwald et al. |
| 5,638,534 A | 6/1997 | Mote, Jr. |
| 5,659,713 A | 8/1997 | Goodwin et al. |
| 5,659,798 A | 8/1997 | Blumrich et al. |
| 5,715,456 A | 2/1998 | Bennett et al. |
| 5,729,709 A | 3/1998 | Harness |
| 5,796,413 A | 8/1998 | Shipp et al. |
| 5,818,844 A | 10/1998 | Singh et al. |
| 5,819,304 A | 10/1998 | Nilsen et al. |
| 5,822,255 A | 10/1998 | Uchida |
| 5,832,250 A | 11/1998 | Whittaker |
| 5,838,931 A | 11/1998 | Regenold et al. |
| 5,875,352 A | 2/1999 | Gentry et al. |
| 5,875,454 A | 2/1999 | Craft et al. |
| 5,887,159 A | 3/1999 | Burrows |
| 5,928,343 A | 7/1999 | Farmwald et al. |
| 5,953,743 A | 9/1999 | Jeddeloh |
| 5,966,724 A | 10/1999 | Ryan |
| 5,973,935 A | 10/1999 | Schoenfeld et al. |
| 5,973,951 A | 10/1999 | Bechtolsheim et al. |
| 5,978,567 A | 11/1999 | Rebane et al. |
| 6,006,340 A | 12/1999 | O'Connell |
| 6,023,726 A | 2/2000 | Saksena |
| 6,029,250 A | 2/2000 | Keeth |
| 6,031,241 A | 2/2000 | Silfvast et al. |
| 6,033,951 A | 3/2000 | Chao |
| 6,061,263 A | 5/2000 | Boaz et al. |
| 6,061,296 A | 5/2000 | Ternullo, Jr. et al. |
| 6,067,262 A | 5/2000 | Irrinki et al. |
| 6,073,190 A | 6/2000 | Rooney |
| 6,076,139 A | 6/2000 | Welker et al. |
| 6,079,008 A | 6/2000 | Clery, III |
| 6,092,158 A | 7/2000 | Harriman et al. |
| 6,098,158 A | 8/2000 | Lay et al. |
| 6,105,075 A | 8/2000 | Ghaffari |
| 6,125,431 A | 9/2000 | Kobayashi |
| 6,128,703 A | 10/2000 | Bourekas et al. |
| 6,128,706 A | 10/2000 | Bryg et al. |
| 6,134,624 A | 10/2000 | Burns et al. |
| 6,137,709 A | 10/2000 | Boaz et al. |
| 6,144,587 A | 11/2000 | Yoshida |
| 6,145,033 A | 11/2000 | Chee |
| 6,157,743 A | 12/2000 | Goris et al. |
| 6,157,962 A | 12/2000 | Hodges et al. |
| 6,167,465 A | 12/2000 | Parvin et al. |
| 6,167,486 A | 12/2000 | Lee et al. |
| 6,175,571 B1 | 1/2001 | Haddock et al. |
| 6,185,352 B1 | 2/2001 | Hurley |
| 6,185,676 B1 | 2/2001 | Poplingher et al. |
| 6,186,400 B1 | 2/2001 | Dvorkis et al. |
| 6,191,663 B1 | 2/2001 | Hannah |
| 6,201,724 B1 | 3/2001 | Ishizaki et al. |
| 6,212,590 B1 | 4/2001 | Melo et al. |
| 6,216,178 B1 | 4/2001 | Stracovsky et al. |
| 6,216,219 B1 | 4/2001 | Cai et al. |
| 6,223,301 B1 | 4/2001 | Santeler et al. |
| 6,233,376 B1 | 5/2001 | Updegrove |
| 6,243,769 B1 | 6/2001 | Rooney |
| 6,243,831 B1 | 6/2001 | Mustafa et al. |
| 6,246,618 B1 | 6/2001 | Yamamoto et al. |
| 6,247,107 B1 | 6/2001 | Christie |
| 6,249,802 B1 | 6/2001 | Richardson et al. |
| 6,252,821 B1 | 6/2001 | Nizar et al. |
| 6,256,692 B1 | 7/2001 | Yoda et al. |
| 6,272,609 B1 | 8/2001 | Jeddeloh |
| 6,285,349 B1 | 9/2001 | Smith |
| 6,294,937 B1 | 9/2001 | Crafts et al. |
| 6,301,637 B1 | 10/2001 | Krull et al. |
| 6,327,642 B1 | 12/2001 | Lee et al. |
| 6,330,205 B2 | 12/2001 | Shimizu et al. |
| 6,330,639 B1 | 12/2001 | Fanning et al. |
| 6,347,055 B1 | 2/2002 | Motomura |
| 6,349,363 B2 | 2/2002 | Cai et al. |
| 6,356,573 B1 | 3/2002 | Jonsson et al. |
| 6,367,074 B1 | 4/2002 | Bates et al. |
| 6,370,068 B2 | 4/2002 | Rhee |
| 6,370,611 B1 | 4/2002 | Callison et al. |
| 6,373,777 B1 | 4/2002 | Suzuki |
| 6,381,190 B1 | 4/2002 | Shinkai |
| 6,389,514 B1 | 5/2002 | Rokicki |
| 6,392,653 B1 | 5/2002 | Malandain et al. |
| 6,401,213 B1 | 6/2002 | Jeddeloh |
| 6,405,280 B1 | 6/2002 | Ryan |
| 6,421,744 B1 | 7/2002 | Morrison et al. |
| 6,430,696 B1 | 8/2002 | Keeth |
| 6,433,785 B1 | 8/2002 | Garcia et al. |
| 6,434,639 B1 | 8/2002 | Haghighi |
| 6,434,696 B1 | 8/2002 | Kang |
| 6,434,736 B1 | 8/2002 | Schaecher et al. |
| 6,438,622 B1 | 8/2002 | Haghighi et al. |
| 6,438,668 B1 | 8/2002 | Esfahani et al. |
| 6,449,308 B1 | 9/2002 | Knight, Jr. et al. |
| 6,453,393 B1 | 9/2002 | Holman et al. |
| 6,460,108 B1 | 10/2002 | McCoskey et al. |
| 6,460,114 B1 | 10/2002 | Jeddeloh |
| 6,462,978 B2 | 10/2002 | Shibata et al. |
| 6,463,059 B1 | 10/2002 | Movshovich et al. |
| 6,467,013 B1 | 10/2002 | Nizar |
| 6,470,422 B2 | 10/2002 | Cai et al. |
| 6,473,828 B1 | 10/2002 | Matsui |
| 6,477,592 B1 | 11/2002 | Chen et al. |
| 6,477,614 B1 | 11/2002 | Leddige et al. |
| 6,477,621 B1 | 11/2002 | Lee et al. |
| 6,479,322 B2 | 11/2002 | Kawata et al. |
| 6,487,628 B1 | 11/2002 | Duong et al. |
| 6,490,188 B2 | 12/2002 | Nuxoll et al. |
| 6,496,193 B1 | 12/2002 | Surti et al. |
| 6,496,909 B1 | 12/2002 | Schimmel |
| 6,501,471 B1 | 12/2002 | Venkataraman et al. |
| 6,502,161 B1 | 12/2002 | Perego et al. |
| 6,505,287 B2 | 1/2003 | Uematsu |
| 6,523,092 B1 | 2/2003 | Fanning |
| 6,523,093 B1 | 2/2003 | Bogin et al. |
| 6,526,483 B1 | 2/2003 | Cho et al. |
| 6,539,490 B1 | 3/2003 | Forbes et al. |
| 6,552,564 B1 | 4/2003 | Forbes et al. |
| 6,553,476 B1 | 4/2003 | Ayaki et al. |
| 6,587,912 B2 | 7/2003 | Leddige et al. |
| 6,590,816 B2 | 7/2003 | Perner |
| 6,594,713 B1 | 7/2003 | Fuoco et al. |
| 6,594,722 B1 | 7/2003 | Willke, II et al. |
| 6,598,154 B1 | 7/2003 | Vaid et al. |
| 6,615,325 B2 | 9/2003 | Mailloux et al. |
| 6,622,227 B2 | 9/2003 | Zumkehr et al. |
| 6,628,294 B1 | 9/2003 | Sadowsky et al. |
| 6,629,220 B1 | 9/2003 | Dyer |
| 6,631,440 B2 | 10/2003 | Jenne et al. |
| 6,633,959 B2 | 10/2003 | Arimilli et al. |
| 6,636,110 B1 | 10/2003 | Ooishi et al. |
| 6,646,929 B1 | 11/2003 | Moss et al. |
| 6,647,470 B1 | 11/2003 | Janzen |
| 6,658,509 B1 | 12/2003 | Bonella et al. |
| 6,662,304 B2 | 12/2003 | Keeth et al. |
| 6,667,895 B2 | 12/2003 | Jang et al. |

| | | |
|---|---|---|
| 6,681,292 B2 | 1/2004 | Creta et al. |
| 6,681,302 B2 | 1/2004 | Cho et al. |
| 6,697,926 B2 | 2/2004 | Johnson et al. |
| 6,704,817 B1 | 3/2004 | Steinman et al. |
| 6,718,440 B2 | 4/2004 | Maiyuran et al. |
| 6,721,195 B2 | 4/2004 | Brunelle et al. |
| 6,724,685 B2 | 4/2004 | Braun et al. |
| 6,728,800 B1 | 4/2004 | Lee et al. |
| 6,735,679 B1 | 5/2004 | Herbst et al. |
| 6,735,682 B2 | 5/2004 | Segelken et al. |
| 6,745,275 B2 | 6/2004 | Chang |
| 6,751,703 B2 | 6/2004 | Chilton |
| 6,754,812 B1 | 6/2004 | Abdallah et al. |
| 6,756,661 B2 | 6/2004 | Tsuneda et al. |
| 6,760,833 B1 | 7/2004 | Dowling |
| 6,771,538 B2 | 8/2004 | Shukuri et al. |
| 6,772,295 B2 | 8/2004 | Spencer et al. |
| 6,775,747 B2 | 8/2004 | Venkatraman |
| 6,782,466 B1 | 8/2004 | Steele et al. |
| 6,788,104 B2 | 9/2004 | Singh et al. |
| 6,789,173 B1 | 9/2004 | Tanaka et al. |
| 6,792,059 B2 | 9/2004 | Yuan et al. |
| 6,792,496 B2 | 9/2004 | Aboulenein et al. |
| 6,795,899 B2 | 9/2004 | Dodd et al. |
| 6,799,246 B1 | 9/2004 | Wise et al. |
| 6,799,268 B1 | 9/2004 | Boggs et al. |
| 6,804,760 B2 | 10/2004 | Wiliams |
| 6,804,764 B2 | 10/2004 | LaBerge et al. |
| 6,807,630 B2 | 10/2004 | Lay et al. |
| 6,816,947 B1 | 11/2004 | Huffman |
| 6,820,181 B2 | 11/2004 | Jeddeloh et al. |
| 6,823,023 B1 | 11/2004 | Hannah |
| 6,829,705 B2 | 12/2004 | Smith |
| 6,832,303 B2 | 12/2004 | Tanaka |
| 6,889,304 B2 | 5/2005 | Perego et al. |
| 6,928,528 B1 | 8/2005 | Hewitt |
| 6,941,433 B1 | 9/2005 | Libby et al. |
| 6,980,042 B2 | 12/2005 | LaBerge |
| 7,107,415 B2 | 9/2006 | Jeddeloh et al. |
| 7,117,316 B2 | 10/2006 | Jeddeloh |
| 7,120,727 B2 | 10/2006 | Lee et al. |
| 7,133,972 B2 | 11/2006 | Jeddeloh |
| 7,162,567 B2 | 1/2007 | Jeddeloh |
| 7,188,219 B2 | 3/2007 | Jeddeloh |
| 7,213,082 B2 | 5/2007 | Jeddeloh |
| 7,254,075 B2 | 8/2007 | Woo et al. |
| 7,315,053 B2 | 1/2008 | Hosomi et al. |
| 7,318,130 B2 | 1/2008 | Morrow et al. |
| 7,716,444 B2 * | 5/2010 | Jeddeloh et al. ............... 711/169 |
| 2001/0039612 A1 | 11/2001 | Lee |
| 2002/0002656 A1 | 1/2002 | Honma et al. |
| 2002/0078298 A1 | 6/2002 | Jeddeloh |
| 2002/0112119 A1 | 8/2002 | Halbert et al. |
| 2002/0116588 A1 | 8/2002 | Beckert et al. |
| 2002/0120709 A1 | 8/2002 | Chow et al. |
| 2002/0144064 A1 | 10/2002 | Fanning |
| 2002/0178319 A1 | 11/2002 | Sanchez-Olea |
| 2003/0005223 A1 | 1/2003 | Coulson et al. |
| 2003/0014578 A1 | 1/2003 | Pax |
| 2003/0015899 A1 | 1/2003 | Clay |
| 2003/0043158 A1 | 3/2003 | Wasserman et al. |
| 2003/0043426 A1 | 3/2003 | Baker et al. |
| 2003/0093630 A1 | 5/2003 | Richard et al. |
| 2003/0156639 A1 | 8/2003 | Liang |
| 2003/0163649 A1 | 8/2003 | Kapur et al. |
| 2003/0177320 A1 | 9/2003 | Sah et al. |
| 2003/0193927 A1 | 10/2003 | Hronik |
| 2003/0223295 A1 | 12/2003 | Ozguz et al. |
| 2003/0227798 A1 | 12/2003 | Pax |
| 2003/0229762 A1 | 12/2003 | Maiyuran et al. |
| 2003/0229770 A1 | 12/2003 | Jeddeloh |
| 2003/0235072 A1 | 12/2003 | Kim et al. |
| 2004/0006671 A1 | 1/2004 | Handgen et al. |
| 2004/0015666 A1 | 1/2004 | Rojas et al. |
| 2004/0019728 A1 | 1/2004 | Sharma |
| 2004/0022094 A1 | 2/2004 | Radhakrishnan et al. |
| 2004/0024959 A1 | 2/2004 | Taylor |
| 2004/0024978 A1 | 2/2004 | Jeddeloh |
| 2004/0034753 A1 | 2/2004 | Jeddeloh |
| 2004/0034825 A1 | 2/2004 | Jeddeloh |
| 2004/0039886 A1 | 2/2004 | Christofferson et al. |
| 2004/0044833 A1 | 3/2004 | Ryan |
| 2004/0049649 A1 | 3/2004 | Durrant |
| 2004/0064602 A1 | 4/2004 | George |
| 2004/0122988 A1 | 6/2004 | Han et al. |
| 2004/0158677 A1 | 8/2004 | Dodd |
| 2004/0170196 A1 | 9/2004 | Susnow |
| 2004/0260909 A1 | 12/2004 | Lee et al. |
| 2004/0268061 A1 | 12/2004 | Khare et al. |
| 2005/0060533 A1 | 3/2005 | Woo et al. |
| 2005/0066137 A1 | 3/2005 | Jeddeloh et al. |
| 2005/0071542 A1 | 3/2005 | Weber et al. |
| 2005/0078506 A1 | 4/2005 | Rao et al. |
| 2005/0105350 A1 | 5/2005 | Zimmerman |
| 2005/0149774 A1 | 7/2005 | Jeddeloh et al. |
| 2005/0223161 A1 | 10/2005 | Jeddeloh |
| 2005/0246558 A1 | 11/2005 | Ku |
| 2005/0286506 A1 | 12/2005 | LaBerge |
| 2006/0085616 A1 | 4/2006 | Zeighami et al. |
| 2006/0168407 A1 | 7/2006 | Stern |
| 2006/0200642 A1 | 9/2006 | LaBerge |
| 2006/0206679 A1 | 9/2006 | Jeddeloh et al. |
| 2006/0212655 A1 | 9/2006 | Jeddeloh et al. |
| 2006/0212666 A1 | 9/2006 | Jeddeloh |
| 2006/0288172 A1 | 12/2006 | Lee et al. |
| 2007/0011392 A1 | 1/2007 | Lee et al. |
| 2007/0033353 A1 | 2/2007 | Jeddeloh |
| 2007/0055817 A1 | 3/2007 | Jeddeloh |
| 2007/0088915 A1 | 4/2007 | Archambault et al. |
| 2007/0113027 A1 | 5/2007 | Jeddeloh |

FOREIGN PATENT DOCUMENTS

| | | |
|---|---|---|
| EP | 0843261 A2 | 5/1998 |
| EP | 0849685 A2 | 6/1998 |
| EP | 1199637 A2 | 4/2002 |
| GB | 2244157 A | 11/1991 |
| JP | 06004401 A | 1/1994 |
| JP | 06028180 A | 2/1994 |
| JP | 08185383 A | 7/1996 |
| JP | 10214223 A | 8/1998 |
| JP | 10228413 A | 8/1998 |
| KR | 000067533 | 11/2000 |
| TW | 491970 B | 6/2002 |
| WO | WO-9318459 A1 | 9/1993 |
| WO | WO-9319422 A1 | 9/1993 |
| WO | WO-9704401 A2 | 2/1997 |
| WO | WO-9923570 A1 | 5/1999 |
| WO | WO-9934294 A1 | 7/1999 |
| WO | WO-0026798 A1 | 5/2000 |
| WO | WO-0043902 A1 | 7/2000 |
| WO | WO-0227499 A2 | 4/2002 |

OTHER PUBLICATIONS

Intel, "Flash Memory PCI Add-In Card for Embedded Systems", Application Note AP-758, Sep. 1997, pp. i-13. cited by other.
Shanley, T. et al., "PCI System Architecture", Third Edition, Mindshare, Inc., 1995, pp. 24-25. cited by other.
"Free On-Line Dictionary of Computing" entry Flash Erasable Programmable Read-Only Memory, online May 17, 2004 [http://foldoc.doc.ic.ac.uk/foldoc/foldoc.cgi?flash+memory]. cited by other.
Intel, "Intel 840 Chipset: 82840 Memory Controller Hub (MCH)", Datasheet, Oct. 1999, pp. 1-178. cited by other.
Micron Technology, Inc., "Synchronous DRAM Module 512MB/1GB (x72, ECC) 168-PIN Registered FBGA SDRAM DIMM", Micron Technology, Inc., 2002, pp. 1-23. cited by other.
Hellwagner, Hermann et al., *"Enabling a PC Cluster for High-Performance Computing"*, The SPEEDUP Journal, vol. 11, No. 1, Jun. 1997, pp. 1-9.

* cited by examiner

| COMMAND CODE | COMMAND | CONTROL | COMMENT |
|---|---|---|---|
| 0000 | NOP | NA | |
| 0001 | DWORD MEMORY WRITE | COUNT | 1 TO 16 DOUBLE WORDS WRITTEN TO MEMORY |
| 0010 | DWORD MEMORY READ | COUNT | 1 TO 16 DOUBLE WORD READ FROM MEMORY |
| 0011 | UNUSED | | |
| 0100 | UNUSED | | |
| 0101 | BYTE MEMORY WRITE | MASK | 1 TO 16 BYTES WRITTEN TO MEMORY |
| 0110 | BYTE MEMORY READ | MASK | 1 TO 16 BYTE READ TO MEMORY |
| 0111 | UNUSED | | |
| 1000 | CONFIG READ | MASK | |
| 1001 | CONFIG WRITE | MASK | |
| 1010-1111 | UNUSED | | |

| COMMAND CODE | COMMAND | COMMENT |
|---|---|---|
| 000 | NOP | |
| 001 | READ RESPONSE | RETURNING READ DATA |
| 010 | WRITE RESPONSE | WRITE COMPLETE |
| 011 | READ & WRITE RESPONSE | WRITE COMPLETE AND RETURNING READ DATA |
| 100 | UNUSED | |
| 101 | UNUSED | |
| 110 | UNUSED | |
| 111 | UNUSED | |

METHOD AND SYSTEM FOR CONTROLLING MEMORY ACCESSES TO MEMORY MODULES HAVING A MEMORY HUB ARCHITECTURE

CROSS-REFERENCE TO RELATED APPLICATIONS

This application is a continuation of pending U.S. patent application Ser. No. 11/881,010, filed Jul. 24, 2007, which is a continuation of U.S. patent application Ser. No. 10/963,824, filed Oct. 12, 2004, issued as U.S. Pat. No. 7,249,236, which is a continuation of U.S. patent application Ser. No. 10/232,473, filed Aug. 29, 2002, issued as U.S. Pat. No. 6,820,181.

TECHNICAL FIELD

This invention relates to memory systems, and, more particularly, to a memory system having several memory modules each of which includes a memory hub coupled to several memory devices.

BACKGROUND OF THE INVENTION

Computer systems use memory devices, such as dynamic random access memory ("DRAM") devices, to store instructions and data that are accessed by a processor. These memory devices are normally used as system memory in a computer system. In a typical computer system, the processor communicates with the system memory through a processor bus and a memory controller. The processor issues a memory request, which includes a memory command, such as a read command, and an address designating the location from which data or instructions are to be read. The memory controller uses the command and address to generate appropriate command signals as well as row and column addresses, which are applied to the system memory. In response to the commands and addresses, data are transferred between the system memory and the processor. The memory controller is often part of a system controller, which also includes bus bridge circuitry for coupling the processor bus to an expansion bus, such as a PCI bus.

The operating speed of memory devices has continuously increased, thereby providing ever-increasing memory bandwidths. However, this increase in memory bandwidth has not kept pace with increases in the operating speed of processors. One approach to increasing memory bandwidth is to access a larger number of memory devices in parallel with each other so that this data are read from or written to this larger number of memory devices with each memory access. One memory architecture that lends itself well to allowing are larger number of memory devices to be simultaneously accessed is a memory hub architecture. In a memory hub architecture, a system controller or memory hub controller is coupled to several memory modules, each of which includes a memory hub coupled to several memory devices. The memory hub efficiently routes memory requests and responses between the controller and the memory devices. Computer systems employing this architecture can have a higher bandwidth because a processor can read data from or write data to one memory module while another memory module is responding to a prior memory access. For example, the processor can output write data to the memory devices in one of the memory modules while the memory devices in another memory module are preparing to provide read data to the processor.

Although memory modules using memory hubs may provide increased memory bandwidth, the presence of memory hubs in the modules can make it difficult to coordinate the flow of command and address signals to the memory modules and the flow of data signals to and from the memory modules. A memory controller in a conventional memory system directly accesses memory devices in memory modules. The absence of any control device, such as a memory hub, between the memory controller and the memory devices makes it relatively easy for the memory controller to coordinate its operation with each of the memory modules. In particular, since the memory controller is actively controlling the activity in each of the memory modules, the memory controller is able to determine the status of memory accesses to each memory module based on the signals it has transmitted to or received from the memory modules. In contrast, the presence of a memory hub on each of the memory modules to control access to the memory devices makes it difficult for a controller to determine the status of memory requests to each memory module since the controller is no longer directly controlling the memory accesses. For example, the controller can no longer determine when a read memory request will be issued to the memory devices on that module. Since the controller cannot determine when the read memory request is issued, it cannot determine when the read data will be coupled from the memory module. As a result, the controller cannot determine when it can issue another read or write memory request to the same or another memory module. Similarly, the controller cannot determine if several memory requests issued to a memory module have been serviced, and thus cannot determine whether additional memory requests should be issued to the memory module. Other types of coordination issues will be apparent to one skilled in the art.

There is therefore a need for a memory system architecture that allows a controller or other device coupled to a plurality of hub-based memory modules to coordinate the issuing of memory requests to the memory modules.

SUMMARY OF THE INVENTION

A memory module hub controller is coupled to a plurality of memory modules each of which includes a memory hub coupled to a plurality of memory devices in the respective module. The memory hub controller stores a plurality of memory requests and transmits each stored memory request to the memory hub in one of the memory modules responsive to a flow control signal that is generated as a function of memory request status signals received from the memory hub to which the memory request is being transmitted. The memory hub stores the received memory requests and couples memory request signals corresponding to the stored memory requests to the memory devices in the memory module. The memory hub also transmits write data to or subsequently receives read data from the memory devices. The memory hub also generates memory request status signals identifying the memory requests that have been serviced by the memory devices coupled to the memory hub. The memory hub then couples the memory request status signals and any read data to the memory hub controller. The controller outputs the received read data and generates the flow control signal based on the memory request status signals to control the number of outstanding memory requests that are stored in each of the memory modules.

DETAILED DESCRIPTION OF THE INVENTION

Figure 1:
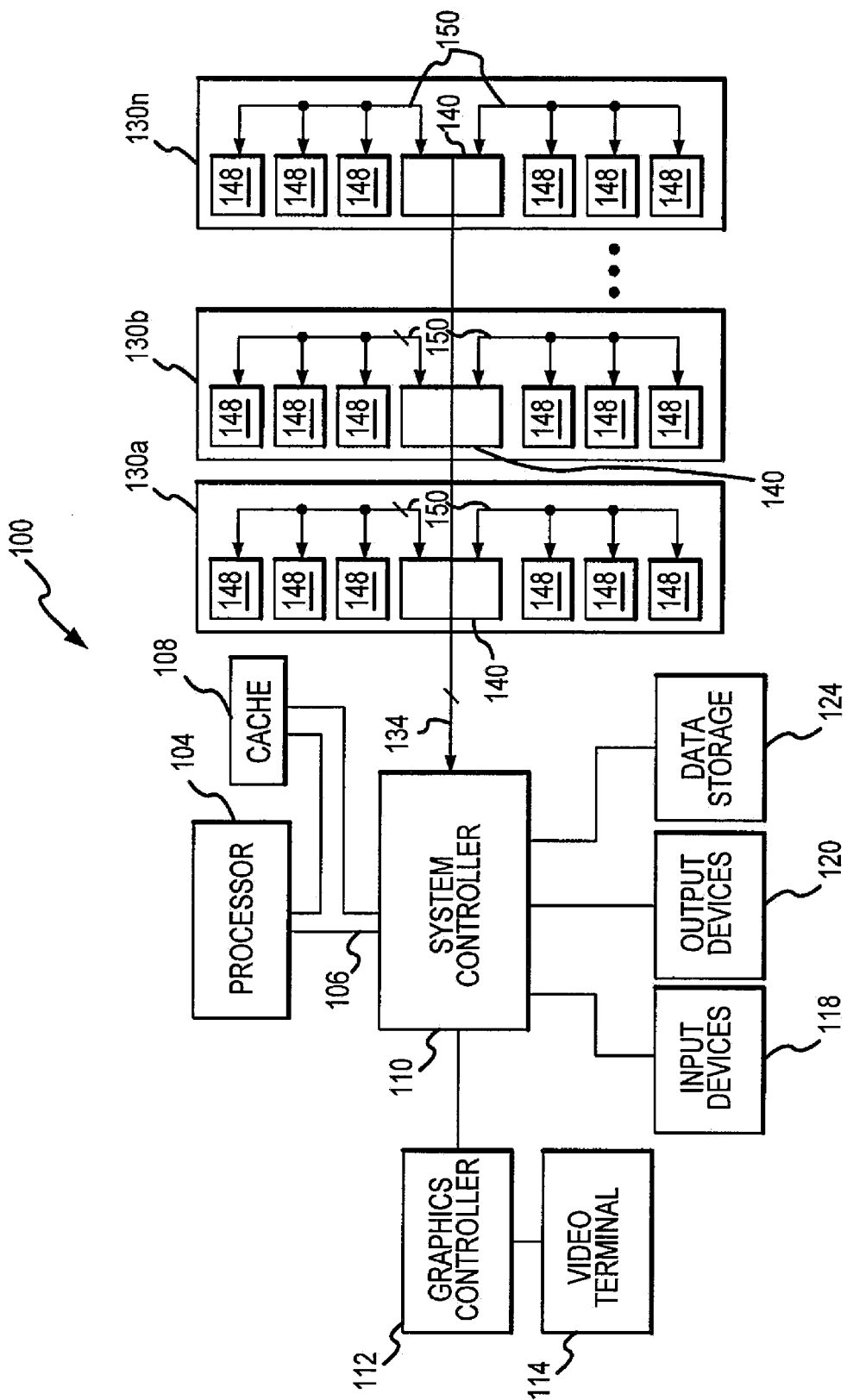
FIG. 1 is a block diagram of a computer system according to one example of the invention in which a memory hub is included in each of a plurality of memory modules.

A computer system 100 according to one example of the invention is shown in FIG. 1. The computer system 100 includes a processor 104 for performing various computing functions, such as executing specific software to perform specific calculations or tasks. The processor 104 includes a processor bus 106 that normally includes an address bus, a control bus, and a data bus. The processor bus 106 is typically coupled to cache memory 108, which, as previously mentioned, is usually static random access memory ("SRAM"). Finally, the processor bus 106 is coupled to a system controller 110, which is also sometimes referred to as a "North Bridge" or "memory controller."

The system controller 110 serves as a communications path to the processor 104 for a variety of other components. More specifically, the system controller 110 includes a graphics port that is typically coupled to a graphics controller 112, which is, in turn, coupled to a video terminal 114. The system controller 110 is also coupled to one or more input devices 118, such as a keyboard or a mouse, to allow an operator to interface with the computer system 100. Typically, the computer system 100 also includes one or more output devices 120, such as a printer, coupled to the processor 104 through the system controller 110. One or more data storage devices 124 are also typically coupled to the processor 104 through the system controller 110 to allow the processor 104 to store data or retrieve data from internal or external storage media (not shown). Examples of typical storage devices 124 include hard and floppy disks, tape cassettes, and compact disk read-only memories (CD-ROMs).

The system controller 110 also includes a memory hub controller 126 that is coupled to several memory modules 130a,b ... n, which serve as system memory for the computer system 100. The memory modules 130 are preferably coupled to the memory hub controller 126 through a high-speed link 134, which may be an optical or electrical communication path or some other type of communications path. In the event the high-speed link 134 is implemented as an optical communication path, the optical communication path may be in the form of one or more optical fibers, for example. In such case, the memory hub controller 126 and the memory modules 130 will include an optical input/output port or separate input and output ports coupled to the optical communication path. The memory modules 130 are shown coupled to the memory hub controller 126 in a multi-drop or daisy chain arrangement in which the single high-speed link 134 is coupled to all of the memory modules 130. However, it will be understood that other topologies may also be used, such as a point-to-point coupling arrangement in which a separate high-speed link (not shown) is used to couple each of the memory modules 130 to the memory hub controller 126. A switching topology may also be used in which the memory hub controller 126 is selectively coupled to each of the memory modules 130 through a switch (not shown). Other topologies that may be used will be apparent to one skilled in the art.

Figure 2:
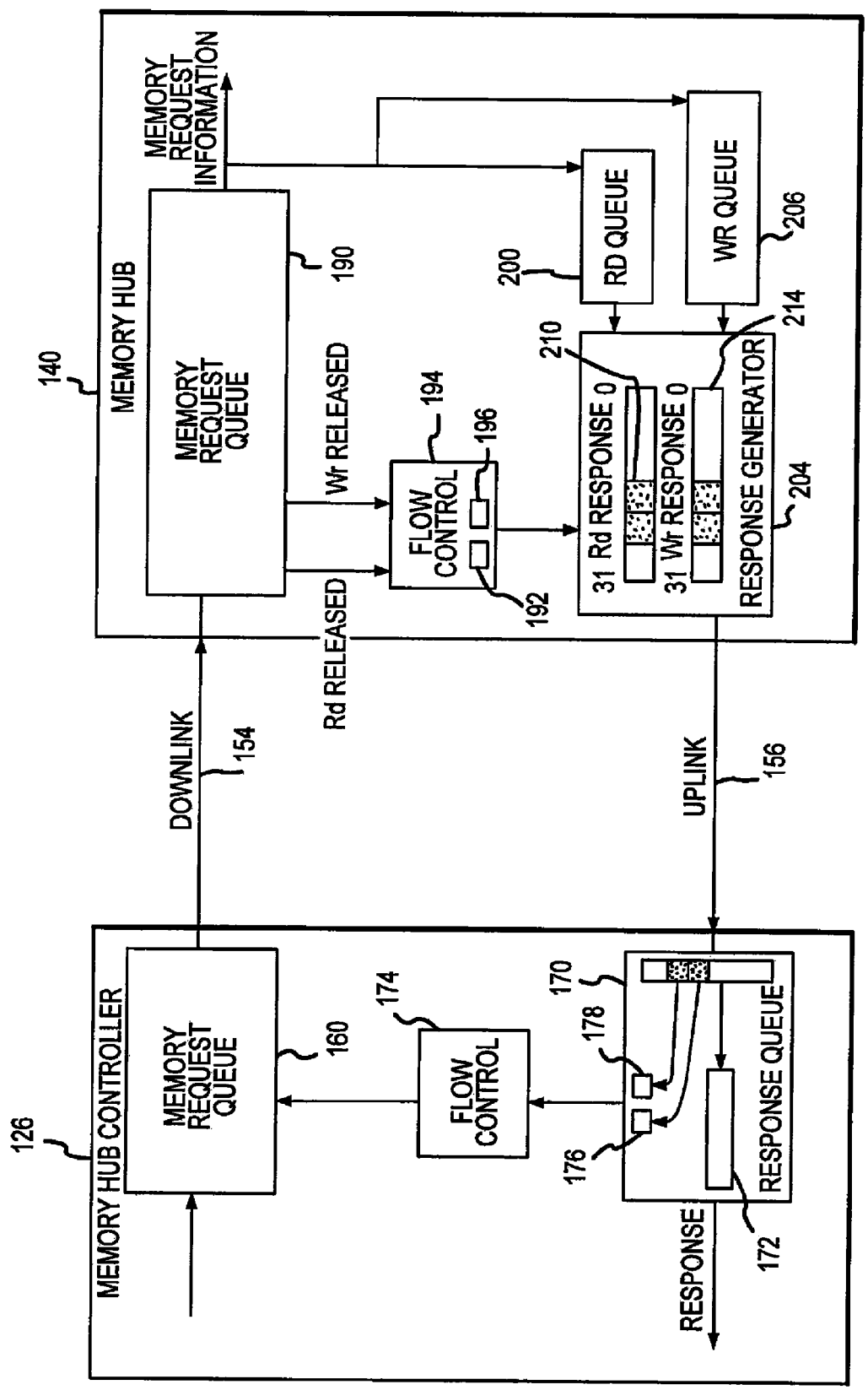
FIG. 2 is a block diagram of one example of a memory hub controller used in the computer system of FIG. 1 coupled to one example of a memory hub used in each of a plurality of memory modules in the computer system of FIG. 1.

Each of the memory modules 130 includes a memory hub 140 for controlling access to 6 memory devices 148, which, in the example illustrated in FIG. 2, are synchronous dynamic random access memory ("SDRAM") devices. However, a fewer or greater number of memory devices 148 may be used, and memory devices other than SDRAM devices may, of course, also be used. The memory hub 140 is coupled to each of the memory devices 148 through a bus system 150, which normally includes a control bus, an address bus and a data bus.

One example of the memory hub controller 126 and the memory hub 140 of FIG. 1 is shown in FIG. 2. As shown in FIG. 2, the high-speed link 134 (FIG. 1) coupling the memory hub controller 126 to the memory hub 140 includes a high-speed downlink 154 and a high-speed uplink 156 that are separate from each other. As previously explained, the downlink 154 and uplink 156 may couple logic signals, optical signals, RF signals or any other type of signaling medium. The downlink 154 and uplink 156 may also be combined in a single high-speed bi-directional link, or the downlink 154 and the uplink 156 may be further divided into a larger number of communication links, such as separate links for the command, address and data signals. Other variations will be apparent to one skilled in the art.

With further reference to FIG. 2, the memory hub controller 126 includes a memory request queue 160 that receives from the processor 104 (FIG. 1) though the system controller 110 high level memory request signals, including command signals, address signals and, in the case of a memory write, write data signals. The memory request queue 160 also receives Request ID signals from a flow control unit 174 that uniquely identify each read request and each write request. These Request IDs are combined with corresponding high level read requests and write requests and stored in the memory request queue 160, preferably in the order they are received. The memory request signals stored in the request queue 160 include both read request signals and write request signals. The high level memory request signals and the Request ID signals will collectively be referred to as memory request signals. The memory request queue may but need not issue the signals to the memory modules 130 in the same order they are received.

The memory hub controller 126 also includes a memory response queue 170 that receives read response signals and write response signals from the system controller 110. The read response signals include read data signals as well as read status signals that identify the read request corresponding to the read data. The write response signals include write status signals that identify a write request that has been serviced by one of the memory modules. The response queue 170 stores the memory response signals in the order they are received, and it preferably, but not necessarily, couples the read data signals 172 to the system controller 110 in that same order. The memory response queue 170 also couples to the flow control unit 174 the read status signals 176 and the write status signals 178 so that the flow control unit 174 can determine which read requests and which write requests have been serviced. The flow control unit 174 makes this determination by comparing the status signals 176, 178 to the Request IDs generated by the flow control unit 174 and coupled to the memory request queue 160. The flow control unit 174 then outputs flow control signals to the memory request queue 160 to allow the memory request queue 160 to determine whether and when it should issue additional memory requests to each of the memory modules 130 (FIG. 1).

With further reference to FIG. 2, the memory hub 140 in each of the memory modules 130 includes a memory request queue 190 that receives one or more memory requests from the memory hub controller 126 through the high-speed downlink 154. The request queue 190 includes circuitry similar to that found in conventional memory controllers to reformat the memory requests to the command and address signals used by the memory devices 148 (FIG. 1) and to issue these reformatted signals to the memory devices 148 at the proper time and sequence. For example, the request queue 190 may convert addresses signals received from the memory hub controller 126 to row and column address signals. The request queue 190 can then output the row address signals to the memory devices 148 along with a row address strobe ("RAS") signal to cause the row address signals to be latched into the memory devices 148. Similarly, the request queue 190 can output the column address signals to the memory devices 148 along with a column address strobe ("CAS") signal to cause the column address signals to be latched into the memory devices 148. However, the nature of the reformatted command and address signals and also possibly data signals will depend upon the nature of the memory devices 148, as will be apparent to one skilled in the art.

When the request queue 190 has issued the reformatted read request signals to the memory devices 148 responsive to read request signals from the memory hub controller 126, it applies a Read Released signal to a flow control unit 194 to indicate that a read request has been issued to the memory devices 148. Similarly, when the request queue 190 has issued the reformatted write request signals to the memory devices 148 responsive to write request signals from the memory hub controller 126, it applies a Write Released signal to the flow control unit 194 to indicate that a write request has been issued to the memory devices 148. The Read Released and Write Released signals are used to formulate the read and write status signals 192, 196, respectively, that uniquely identify each read request and write request serviced by each of the memory modules 130. More specifically, the flow control unit 194 assigns a unique read response ID, which preferably corresponds to the Request ID coupled to the memory request queue 160 from the flow control unit 174, to each released read request. The flow control unit 194 also assigns a unique write response ID to each released write request, which preferably also corresponds to the Request ID. These response IDs are coupled to the response queue 170 as read and write status signals. As previously explained, these status signals are coupled to the memory response queue 170, which separates the status signals from any read data included in the response and couples the status signals to the flow control unit 174.

In response to a read memory request from the request queue 190, the memory devices 148 couples read data signals to the memory hub 140. These read data signals are stored in a read queue 200. The read queue 200 subsequently couples the read data signals to a response generator 204, which also receives the read status signals 192 from the flow control unit 194.

When the request queue 190 issues write requests, signals indicating that the write requests have been issued are stored in a write queue 206. The write queue 206 subsequently couples the signals indicative of issued write requests to the response generator 204, which also receives the write status signals 196 from the flow control unit 194.

The response generator 204 associates the read data signals from the read queue 200 with the read status signals 192 from the flow control unit 194, which, as previously mentioned, identifies the read request corresponding to the read data. The combined read data signals and read status signals 192 are combined into a read response 210. In response to the signals from the write queue 206, the response generator 204 generates a write response 214 containing the write status signals 192. The response generator 204 then transmits the read response 210 or the write response 214 to the response queue 170 in the memory hub controller 126. More specifically, the read data signals are transmitted from the response generator 204 to the response queue 170. The read and write status signals 192, 196, respectively, are also transmitted from the response generator 204 to the response queue 170, either alone in the case of some of the write status signals or in combination with read data signals in the case of the read status signals or the other write status signals. Thus, the read response 210 contains the read data as well as information uniquely identifying the read request corresponding to the read data, and the write response 214 contains information uniquely identifying each write request serviced by the memory module 130.

The number of write requests or read requests that can be outstanding in any memory module 130 before the memory request queue 160 will not issue any additional memory requests can be either fixed or user selectable by programming either the memory hub controller 126 with values indicative of the allowable request queue depth. Further, the number of read requests that can be outstanding may be the same or be different from the number of write requests that can be outstanding.

Figures 3A, 3B:
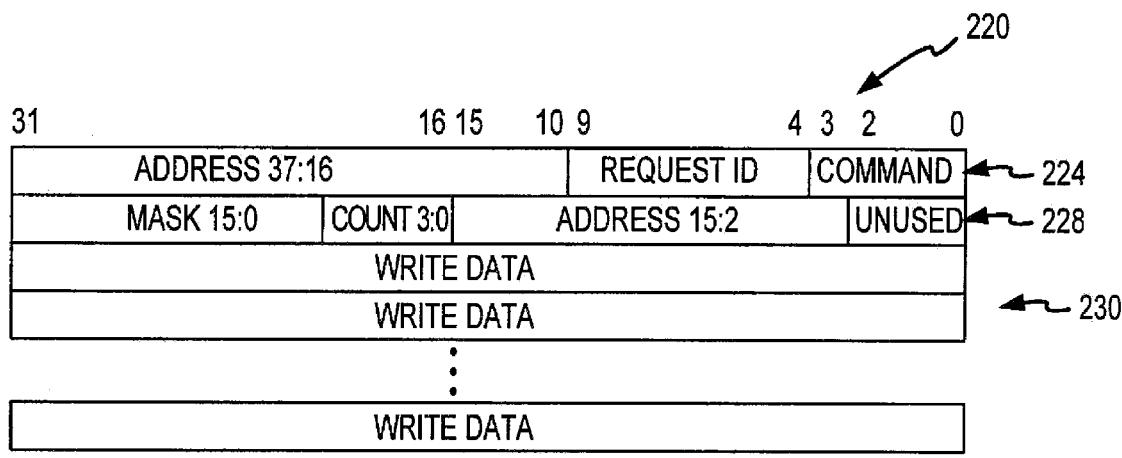
FIGS. 3A and 3B are tables showing one example for the format of a memory request packet transmitted from the memory hub controller to the memory hub of FIG. 2.

An example of a memory request coupled from the memory request queue 160 in the memory hub controller 126 to the memory request queue 190 in the memory hubs 140 is shown in FIG. 3A. In the example shown in FIG. 3A, the memory request is in the form of a memory request packet 220 containing several packet words, although the memory requests can have other formats, as will be apparent to one skilled in the art. The first 4 bits of a first packet word 224 are a Command code that identifies the type of memory request being issued by the request queue 160. These command codes are identified in FIG. 3B. For example, a command code of "0000" signifies a no operation command, a command code of "0001" signifies request to write between 1 and 16 double words (i.e., groups of 32 bits), a command code of "0010" signifies request to read between 1 and 16 double words, etc. Returning to FIG. 3A, the next 6 bits of the first packet word 224 comprise the Request ID issued by the flow control unit 174 (FIG. 2) that uniquely identifies each memory request. As previously explained, by uniquely identifying the memory requests, the flow control unit 174 in the memory hub controller 126 can determine which memory requests have been serviced. The final 22 bits of the first packet word 224 are the high order bits 37:16 of a memory address to which the memory request is directed.

The first 2 bits of a second packet word 228 are unused in the packet example shown in FIG. 3A. The next 15 bits are the low order bits 15:2 of the memory address to which the memory request is directed. There are no address bits 1:0 transmitted because such address bits would select specific bits in each byte of data and all memory accesses are to at least a byte of data.

The memory request queue 190 in one of the memory hubs 140 may use the high order bits 37:16 as a row address and the low order bits 15:2 as a column address, or it may use these addresses in some other manner. The next 4 bits of the second packet word 228 are Count 3:0 bits that specify the number of double words or bytes that will be read from or written to the memory devices 148 on the memory module. The final 16 bits of the second packet word 228 consist of mask data Mask 15:0 that can be coupled to the memory hub controller 126 instead of read data called for by a read memory request. Masking data in this manner is well known to one skilled in the art.

Following the first 2 packet words 224, 228 for a write request is at least one packet word 230 of write data. The number of packet words 230 will depend upon the value of Count 3:0 in the second packet word 228 and whether the memory write command is for writing a double word or a byte. For example, a Count 3:0 value of "0100" (i.e., 4) in a packet requesting a double word write will require 4 packet words 230 of write data. A Count 3:0 value of 4 in a packet requesting a byte write will require only a single packet word 230 of write data. A packet 220 for a read request will not, of course, include any packet words 230 following the first two packet words 224, 228.

Figures 4A, 4B:
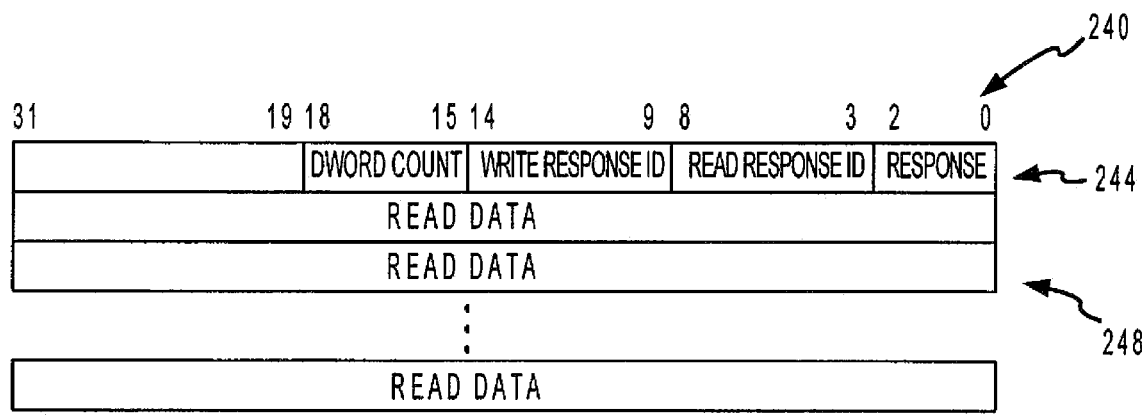
FIGS. 4A and 4B are tables showing one example for the format of a memory response packet transmitted from the memory hub controller to the memory hub of FIG. 2.

An example of a memory response 210 or 214 coupled from the response generator 204 in one of the memory hubs 140 to the memory response queue 170 in the memory hub controller 126 is shown in FIG. 4A. The memory response is in the form of a memory response packet 240 containing several packet words, although the memory requests can have other formats as will be apparent to one skilled in the art. The first 4 bits of a first packet word 244 is a Response Code that identifies the type of memory response being transmitted by the response generator 204. These Response codes are shown in FIG. 4B. For example, a Response code of "000" again signifies a "No Operation" response, and a Response code of "001" signifies a "Read Response," which will return read data and read status signals indicating which read request has been serviced to the response queue 170 in the memory hub controller 126. A Response code of "010" signifies a "Write Response," which will provide write status signals to the response queue 170 in the memory hub controller 126 indicating which write request has been serviced. Finally, a Response code of "011" signifies a "Write and Read Response," which will include read status signals and write status signals in a packet containing read data. As mentioned above, the write status signals in the packet will not pertain to the same memory request as the memory request for the read data signals in the packet. In general, it is more efficient to provide write status signals by including them with read data in a Write and Read Response since only one response is required to provide both read and write status information. However, if data is not being read from a memory module 130, then it may be necessary to return a "Write Response" to provide the memory hub controller 126 with information about the status of write requests. However, "Write Response" packets can be delayed, if desired, until a predetermined number of outstanding write responses have accumulated in any one of the memory modules 130.

Returning to FIG. 4A, the next 6 bits of the first packet word 244 are the Read Response ID generated by the flow control unit 194, which uniquely identifies each memory read request. This Read Response ID will generally correspond to the Request ID in the first packet word 224 of each read request packet 220. The Read Response ID corresponds to the read status signals referred to above. The next 6 bits of the first packet word 244 are a Write Response ID also generated by the flow control unit 194 that uniquely identifies each memory write request. This Write Response ID will again generally correspond to the Request ID in the first packet word 224 of each write request packet 220. The Write Response ID corresponds to the write status signals referred to above. The flow control unit can compare these Response ID values to the Request values to determine if any read or write memory request issued by the memory hub controller 126 has been serviced. The next 4 bits of the first packet word 244 are Dword Count bits that specify the number of double words of read data will be included in the packet 240. The final 13 bits of the first packet word 244 are unused. If the response packet 240 is a read response packet, the first packet word 244 will be followed by one or more read data packet words 248. The number of read data packet words will, of course, depend on the value of Dword Count in the packet word 244.

From the foregoing it will be appreciated that, although specific embodiments of the invention have been described herein for purposes of illustration, various modifications may be made without deviating from the spirit and scope of the invention. For example, although the memory hub controller 126 has been described as permitting a specific number or programmable number of memory requests to be outstanding in any memory module 130, other operating protocols are possible. Also, rather than simply delay issuing memory requests to a memory module 130 having too many outstanding memory requests, the memory hub controller 126 may instead route memory requests to a different memory module 130. Accordingly, the invention is not limited except as by the appended claims.

The invention claimed is:

1. A system comprising:
   at least one memory device operable to output read data signals; and
   a response generator coupled to the at least one memory device, the response generator having a first input terminal operable to receive the read data signals from the at least one memory device, a second input terminal operable to receive read status signals, the read status signals identifying read requests corresponding to each read data signal, and an output terminal, the response generator operable to generate read responses each comprising one of the read data signals and corresponding read status signals, the response generator further being operable to transmit the read responses from the output terminal.

2. The device of claim 1 wherein the first input terminal is coupled to a flow control unit and the second input terminal is coupled to a read queue.

3. The device of claim 1 further comprising a third input terminal operable to receive write signals, the second input terminal further operable to receive write status signals, the generator further being operable to generate write responses each comprising the write status signal.

* * * * *